Figure 1:
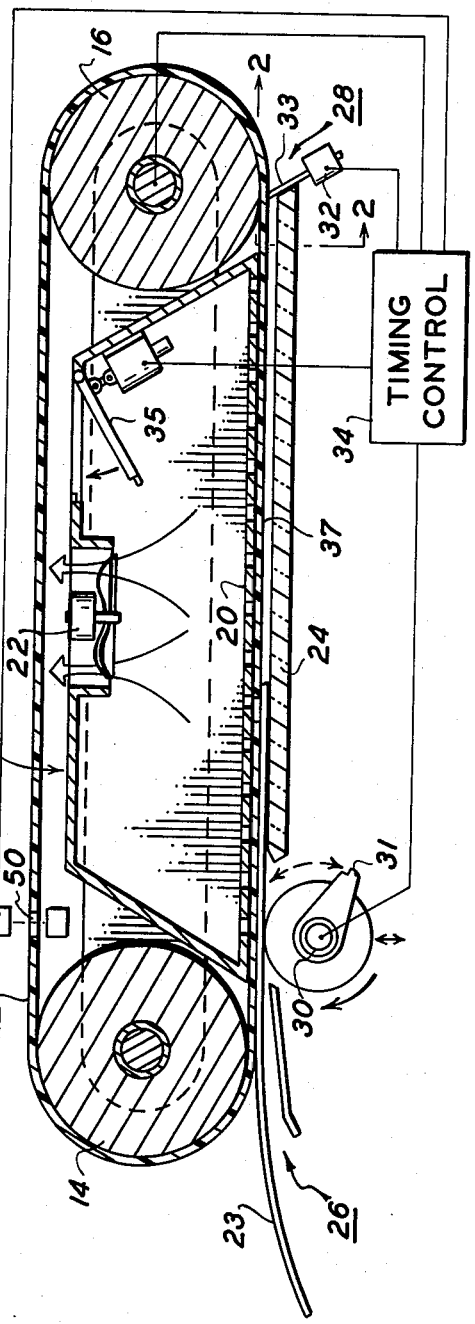

United States Patent [19]

Silverberg

[11] 4,295,737

[45] Oct. 20, 1981

[54] GROOVED BELT DOCUMENT REGISTRATION SYSTEM

[75] Inventor: Morton Silverberg, Rochester, N.Y.

[73] Assignee: Xerox Corporation, Stamford, Conn.

[21] Appl. No.: 111,062

[22] Filed: Jan. 10, 1980

[51] Int. Cl.³ .................. G03B 27/62; G03B 27/64
[52] U.S. Cl. .................................. 355/76; 198/689;
226/95; 271/197; 271/245; 355/91
[58] Field of Search ............... 355/75, 76, 91, 133,
355/8; 198/689; 271/197, 245; 226/95

[56]  References Cited

U.S. PATENT DOCUMENTS

| 3,123,354 | 3/1964 | Ungerer | 271/197 |
| 3,425,610 | 2/1969 | Stewart | 226/95 |
| 3,452,982 | 7/1969 | Bischoff | 271/197 |
| 3,477,558 | 11/1969 | Fleischauer | 198/689 X |
| 3,583,614 | 6/1971 | Foster, Jr. | 271/197 X |
| 3,677,643 | 7/1972 | Sagawa | 355/91 |
| 3,863,912 | 2/1975 | Korff | 271/245 |
| 3,910,570 | 10/1975 | Bleau | 271/245 |
| 4,008,956 | 2/1977 | Stemmle | 355/8 |
| 4,043,665 | 8/1977 | Caldwell | 355/76 |
| 4,047,812 | 9/1977 | Hogan | 355/76 |

Primary Examiner—Richard A. Wintercorn

[57]  ABSTRACT

An original document handling apparatus for moving successive individual document sheets on the surface of a movable belt into a registered position for copying at a copier imaging station, including registration fingers movable into and out of the path of the documents, in which the belt has a plurality of narrow elongated grooves extending in the direction of movement of the belt and having gently sloped walls to avoid reproducible shadows, and wherein the registration fingers are adapted to interfit into the grooves for the registration of the documents. The grooves preferably also include vacuum apertures therein.

8 Claims, 2 Drawing Figures

U.S. Patent     Oct. 20, 1981     4,295,737

GROOVED BELT DOCUMENT REGISTRATION SYSTEM

Cross-reference is made to related applications with the same filing date and assignee, Ser. Nos. 111,051; 111,058; 111,059; 111,060; 111,061; and 111,063.

For the faster xerographic and other document copiers now in commercial use, it is increasingly desirable to provide for automatic handling of the individual original documents being copied in order to utilize those higher speed copying capabilities. However, such documents can vary widely in sheet size, weight, thickness, material, condition, humidity, age, and value. The documents may have curls, wrinkles, tears, "dog-ears," cut-outs, overlays, paste-ups, tape, staples, adhesive areas, or other irregularities. Yet it is desirable to be able to semi-automatically or automatically copy a set of documents with a mixture of sizes, types, and conditions, without document jams or document damage. Further, it is desirable to handle such documents with a relatively compact and inexpensive document handling system. Preferably the document handling system is one which may be positionable over an existing or conventional external transparent copying platen (window) of a copier, and which can utilize the same existing or conventional optics system. That is, it is desirable that the automatic document handling system be readily removable from the platen area by the copier operator whenever desired to allow for conventional manual copying of documents, such as books, on the same copying platen.

One of the most important, and difficult to achieve, requirements for automatic or semi-automatic document handling is the accurate and reliable, but safe, transporting and registration of the original document at the proper position for copying. The document should normally be precisely center registered or corner registered (depending on the copier) over the copier platen. This registration accuracy is desirably consistently within less than a millimeter. If the document is not properly registered, or slips after registration, undesirable dark borders and/or edge shadow images may appear on the ensuing copy, and/or information near edges of the original documents may be lost, i.e., imaged beyond the edges of the copy sheet or not imaged.

Known document handling systems include various document transports which move the original documents over the platen. This may be a single or multiple belt transport which utilizes frictional or electrostatic forces. However, it is known to be advantageous to have positive vacuum detention or gripping of the document against the belt by vacuum apertures in the belt to avoid uncontrolled slippage or skewing of the document relative to the transport belt, as disclosed in U.S. Pat. Nos. 4,043,665 issued Aug. 23, 1977 to John R. Caldwell, or 4,008,956 issued Feb. 22, 1977 to Denis J. Stemmle. Other vacuum belt document transport publications include "Research Disclosure" Publications No. 16659, February 1978; No. 17427, October 1978; and No. 17809, February 1979, published by Industrial Opportunities, Ltd., Havant, Hampshire, U.K..

While not designed for document handling for a copier, with appropriate optical characteristics, etc., it is known to provide vacuum transports for sheets with ribs extending substantially above the vacuum apertured surface to distribute the vacuum under the sheet to be transported. Examples are shown in U.S. Pat Nos. 3,123,354 issued Mar. 3, 1964 to F. Ungerer; 3,452,982 issued July 1, 1969 to E. Bischoff; 3,477,558 issued Nov. 11, 1969 to F. J. Fleischauer and 3,583,614 issued June 8, 1971, to J. E. Foster. Multiple belt copy sheet transports with vacuum applied in the spaces between the belts are also known, e.g., U.S. Pat. No. 3,281,144 issued Oct. 25, 1966, to L. H. Turner et al., and 3,743,403 issued July 3, 1973 to F. J. Sanza.

It is also known to register the original document with roller nips or retractable or fixed registration gates in various ways. One way is to pre-register the document to a vacuum belt with pre-registration fingers or rollers and move the document on the belt a known distance over the platen into registration without slippage, as disclosed in the above-cited patents. Another way is to provide retractable registration fingers (or a fixed gate or stop edge) aligned with one edge of the platen and engaging a frictional (non-vacuum) belt to normally stop an edge of the document being transported by the belt at the registration position overlying the platen, as disclosed in U.S. Pat. No. 3,910,570 issued Oct. 7, 1975, to Charles D. Bleau, or various of the earlier references cited in the above Caldwell U.S. Pat. No. 4,043,665. In such systems the belt must slip relative to the document without damaging it once the document has been stopped, at least briefly until the belt is stopped. The Bleau U.S. Pat. No. 3,910,570 also discloses rollers 32 engaging the inside of the belt 17 between each pair of the gate fingers 29 to form localized bubbles or protrusions of the belt. (See FIG. 4 and Column 4, lines 43 et al., for example). U.S. Pat. No. 3,863,912 issued Feb. 4, 1975 to R. D. Korff discloses a document belt with parallel ridges extending around the belt in its direction of movement. It is known that the document may be either driven forward into a downstream platen edge registration gate or reversed over the platen to back the document up against an upstream platen edge registration gate. It is also known to register documents without such gates or other stops by sensing the passage of the lead or trail edge of the document with a photodetector as it moves toward or past registration and driving the document belt forward or backward for a brief fixed distance or time thereafter without slippage of the document thereon, providing the documents are de-skewed.

In these above-described systems where the document is on a moving belt transport but must be registered at a precise location by a registration gate, to the belt or to a fixed position, there is a serious difficulty in avoiding the escape or slippage of the document from between the tips of the registration gate fingers and the moving belt, particularly for certain document weights and conditions (e.g., curled edges). Besides loss of registration, such slippage can cause serious damage to the original documents. Also, if a document is stopped by only one of two or more spaced fingers it can become skewed. Besides mis-registration image loss and edge or background effects this skewing can cause serious problems in the further transporting of the document.

If the document transport comprises a plurality of separate narrow document belts, the registration fingers can be extended up between the belts to insure capture of the document edge. However, as noted in the above-cited Bleau patent, such separate belts can produce background stripes on the copies from the images or shadows of the belt edges which are behind and adjacent the document. This is aggrevated by dirt contamination of the belt edges.

Such "show-through" and/or "show-around" background printout on the copies, respectively, is a general problem with various document transport belts. That is, when a document is imaged for copying against a belt, any optically significant irregularities in the belt surface can be copied also, to print-out on the copies as undesirable dark background areas. To avoid this problem, a single smooth, continuous and optically uniform light reflective document belt surface larger than the largest document to be copied thereon is preferred. Any edges, transitions or vacuum apertures in the belt in the exposure area can produce shadows which "show-through" translucent documents being copied, and/or "show-around" any mis-registered or undesized documents. Normal dirt contamination (darkening) of belt surface irregularities aggravates these background problems.

Show-around problems and registration criticality can be reduced by slightly magnifying the document image to "overfill" the copy sheet area, or by registering a document edge beyond the imaged area. However, both approaches sacrifice the non-imaged information near the edges of the document, and that loss is additive for copies of copies. Further, when reduction copying of a document is done (i.e., less than 1:1 optical reproduction), or where the document is smaller than the copy sheets, the image reproduced on the copy will include substantial areas of the belt which are within the now expanded original image area and thus beyond (outside the area of) the document. Thus, the potential "show-around" problem area is more extensive.

One partial approach to the "show-around" problem is to not aperture the vacuum belt in narrow bands corresponding to the normal edge positions of the documents as disclosed in U.S. Pat. No. 4,047,812 issued Sept. 13, 1977 to James W. Hogan. However, as noted there, this results in no vacuum holddown forces being applied to those areas of the document. Also, since the aperture pattern is otherwise continuous, the apertures are still visible adjacent the lead and trail edges of the document. This Hogan patent, and the above-cited Caldwell patent, approach the "show through" problem by using small diameter vacuum apertures. However, as noted there, very fine holes are subjected to clogging by paper lint and other contamination. They also provide increased air resistance and a smaller effective vacuum area, thereby increasing the power requirements of the vacuum source to maintain desired vacuum acquisition and holding forces on the document. U.S. Pat. No. 3,677,643 issued July 18, 1972 to B. K. Sagawa teaches vacuum document exposure drum with vacuum orifices recessed within reflective conical recesses to prevent orifice print-out in an overlay (contact print) copier.

The present invention is not limited to any particular type of document illumination system, and is applicable to, for example, either scanning lamp stationary document copying or moving document stationary optics copying (slit scanning). However, it is particularly suitable for full frame flash illumination systems with light directed and reflected to the document and document belt from all angles, since this assists in eliminating edge shadows. One such illumination system is disclosed in U.S. application Ser. No. 15,558 filed Feb. 26, 1979 by John A. Durbin et al. and its cited art.

The present invention overcomes or minimizes the above-discussed problems by providing a combination of a single document belt with grooves in the direction of document movement, which grooves receive mating registration fingers below the document retaining surface for better, more positive, registration, yet which grooves are so constructed as to appear optically smooth to the copier optics so as to minimize visible stripes on other background on the copies. The same belt grooves may also be used to provide an improved document vacuum retention system.

A specific feature of the disclosed system is to provide an original document handling apparatus for moving successive individual document sheets on the surface of a movable belt into a registered position for copying at a copier imaging station, including registration means cooperatively engaging the belt and movable into and out of the path of the documents for their registration, characterized by the movable belt having a plurality of narrow elongated permanent grooves therein, which extend in the direction of movement of the belt below the surface thereof, which grooves are transversely spaced on the belt and have gently sloped walls to avoid reproducible shadows at the copier imaging station, and wherein the registration means comprises at least two registration fingers which are transversely spaced corresponding to at least two of these grooves, these fingers being narrower than the grooves and adapted to interfit into the grooves for the registration of the documents against the fingers without slippage between the documents and the fingers. The grooves preferably also include vacuum apertures therein for applying a vacuum along the grooves between the belt and the documents.

Figure 2:
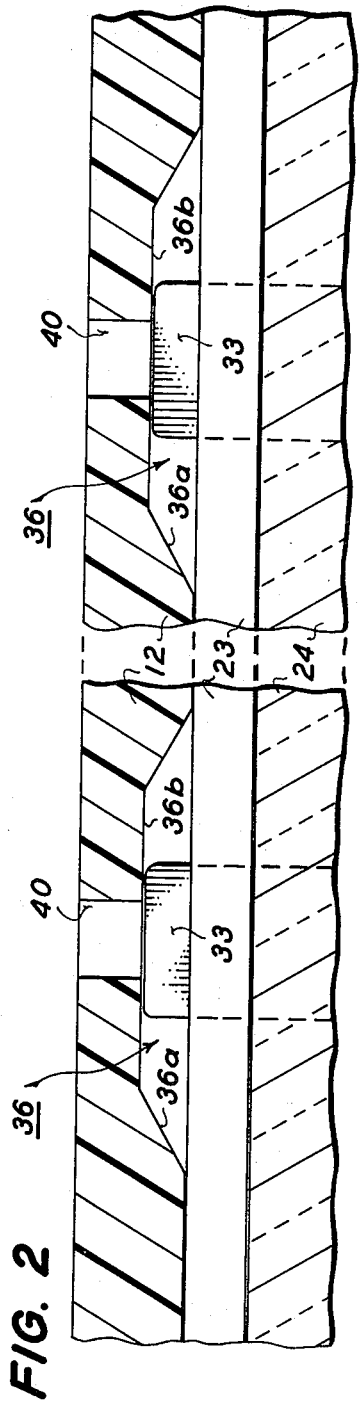

Further features and advantages of the present invention pertain to the particular apparatus whereby the above noted aspects of the invention are attained. Accordingly, the invention will be better understood by reference to the following description, including the drawings forming a part thereof, wherein:

FIG. 1 is a cross-sectional side view of an exemplary document handling system in accordance with the present invention; and FIG. 2 is a partial enlarged and compressed cross-sectional view taken along the transverse line 22 of FIG. 1.

Referring to FIGS. 1 and 2, they illustrate one example of the present invention. However, it will be appreciated that the invention may have many other different structures or orientations, and combinations with various xerographic or other copying systems. The above-cited and other patents and the cross-referenced incorporated related applications provide examples of further or alternative apparatus.

Referring first to FIG. 1, there is shown an exemplary document handling apparatus 10. This drawing is not to scale, as it is transversely foreshortened for drawing clarity. That is, the document belt 12 illustrated would be preferably relatively more elongated between its end support and drive rollers 14 and 16. Further, while a semi-automatic document handling system for a copier is illustrated here, it will be appreciated that the invention is applicable to a recirculating document handling system for pre-collation copying as well.

In the exemplary apparatus 10 of FIG. 1 there is illustrated a vacuum manifold 18 with an aperture plate 20 for applying a vacuum to the backside of an apertured vacuum document belt 12, which vacuum is provided by a blower 22. The document belt 12 and the plate 20 are mounted so that a document 23 may be transported on the document belt 12 closely and evenly spaced above the transparent platen 24 of the copier, where the document may be copied within the depth of focus of the optical system of the copier through the platen 24.

Documents 23 here are inserted into the belt transport system at a document input area 26 near the upstream end of the belt 12. The documents may then be ejected from an output area 28 at the downstream end of the belt and the platen. Alternatively, the belt drive may be reversed to eject the document from the input area 26. It will be appreciated that various known sheet guides or baffles, and/or idler rollers engaging the belt 12, as shown at the input area 26, may be utilized to assist the document path at either the input or output areas. Upstream pre-registration gates or rollers may also be provided.

Referring now to the registration of the documents 23 at the desired copying position on the platen 24, there are illustrated in FIG. 1 two registration gate systems; an upstream registration gate 30 and a downstream registration gate 32. These gates 30 and 32 have respective sets of registration fingers 31 and 33 which are movable in and out of the path of the documents for their registration, i.e., toward and away from cooperative engagement with the belt 12.

As indicated, there are various types of registration systems for successfully registering individual document sheets on the surface of the belt 12 in the registration position for copying at the copier imaging station. For example only one, or both, of the registration gates 30 and 32 illustrated here may be utilized, and these gates may have different structures or be utilized in different manners.

Both of the illustrated registration gates 30 and 32 as well as the belt drive may be conventionally controlled by a timing control 34. Preferably the control 34 is incorporated in a general conventional central copier microprocessor control with software programming. However, it may be provided by any desired conventional logic, such as commercial timing circuits, or multiple lobe cams on a timing shaft, or any other suitable timing system which provides the desired sequence of operations.

The present invention is not limited to any particular registration system but rather relates to the inter-relationship between the registration fingers and the unique construction of the document belt 12 to be described hereinbelow. However, some examples of the operation of possible registration systems will be briefly discussed. In one mode, the upstream registration gate 30 pre-registers the document to a selected fixed position on the belt 12 upstream of the platen and then the document is driven for a known fixed distance from that gate 30 downstream over the platen without slippage. Copying takes place after this known advancement into the registration position, as described in the above-cited U.S. Pat. No. 4,043,665. Note that in such a system the downstream registration gate 32 is not required. However, if desired, it may be additionally provided for final or re-registration.

Alternatively, only the downstream registration gate 32 may be utilized, i.e., the document would not be pre-registered. In this case, the document is driven by the belt 12 over the platen until the lead edge of the document contacts the raised registration fingers 33, which are positioned directly at the downstream (beveled) edge of the platen 24. Relative frictional slippage is then provided between the belt 12 and the document so that the document may deskew and fully align against all the registration fingers 33. For this, the document belt is run for at least a brief period after the registration is achieved by the downstream registration gate 32.

For this registration mode there is additionally illustrated here an intermittently operable vacuum control valve 35. This may be a solenoid actuated flapper valve controlled by the timing control 34, as shown, in coordination with one or both registration systems. Opening of the valve 35 quickly reduces the vacuum in the manifold 18, and thereby reduces the vacuum applied through the document belt 12 to allow slippage between the document and the belt during registration. Closing of the valve 35 quickly restores the vacuum. This valve operation may also be down during initial loading or pre-registration of the document onto the belt 12 at the input area 26. If desired, the area to which such a controlled vacuum may be applied may be a separate portion of a belt, i.e., a separate vacuum manifold chamber or section.

The downstream registration gate 32 is conventionally opened by its solenoid or other actuator linearly pulling the articulated registration fingers 33 out the path of the document. After the document is copied it may then be ejected in either direction from the platen by the belt drive. The upstream registration gate 30 conventionally operates, as shown by its dashed line with arrows, by rotating in and out of the document path, with a clutch drive, cam, or solenoid.

Referring now to FIG. 2, the unique configuration of the belt 12 and its inter-relationship to the sets of registration fingers 31 and/or 33 will be described with reference to this enlarged view of one example thereof. This is a view of two of the fingers 33, which are extending transversely across the path of the documents, perpendicular the direction of belt motion. However, the same view of the fingers 31, if raised, would appear the same, and this description applies to both.

It may be seen that the belt 12 has a plurality of narrow elongated permanent grooves 36 in minor areas thereof. These grooves 36 extend linearly in the direction of movement of the belt and are below the planar document transporting outer surface 37 of the belt. The grooves 36 are much narrower in width (the transverse dimension in FIG. 2) than the spacing across the belt between the grooves. That is, the grooves may be fairly widely transversely spaced apart on the belt. All of the grooves 36 have gently sloped side walls 36a which are so configured as to avoid any reproducible shadows from the grooves at the copier imaging station. That is, the side walls transition at a gentle acute angle from the document transporting surface 37 so that there are no "edge shadows" from the sides of the grooves. The entire groove 36, i.e., both sides 36a and the bottom or base 36b, are thereby fully illuminated by the illumination system of the copier. The base 36b is preferably not more than approximately one millimeter in depth below the surface 37, but at least approximately 0.12 millimeters deep. The groove surfaces preferably have substantially the same or better reflective characteristics as the surface 37. Thus, both show-through and showaround copy defects are avoided.

Still referring to FIG. 2, there are shown two registration fingers 33 which are transversely spaced corresponding to the grooves 36. It will be appreciated that there may be more than two. As shown, these registration fingers 33 are narrower than the grooves and adapted to interfit into the grooves below the surface 37 to provide improved registration of the document against the registration fingers 33 without slippage between the document and the fingers. The fingers 33 are substantially spaced apart, preferably by more than half the transverse dimension of the document to be registered, so as to register and deskew the document lead edge as it comes into abutment with the fingers 33.

The width of the grooves 36, preferably less than approximately 5 millimeters, is sufficiently narrow such that the beam strength of the document 23 prevents even a thin document from sagging or being pulled into contact with the base 36b of the grooves 36, even when a vacuum is applied to the grooves 36. In contrast, the fingers 33, specifically the smooth tips thereof, are designed and configured to fully or substantially extend into the full depth of the grooves 36 to the base 36b, thus preferably at least approximately 0.12 millimeters. The tips of the registration fingers 33 preferably extend substantially beyond the document 23 into the belt during registration. The lead edge of the document 23 is thereby precluded from riding up over the tips of the fingers 33 and therefore cannot slip between the registration fingers and the belt during registration.

Some slight corregation of light weight sheets partially into the grooves is desirable. This increases the stiffness or beam strength of these thinner sheets and further assists their being stopped by the registration fingers.

Both the belt 12 and the grooves 36 therein utilized for registration are preferably endless and continuous. This has the advantage that the registration fingers may be actuated at any time or at any position of the belt relative thereto and be able to enter their corresponding grooves and remain there as long as desired. Note that only a few of the grooves 36 need be utilized for registration fingers. Also note that the grooves do not need to be provided across the full width of the belt, only less than the width of the narrowest document to be transported.

It will be appreciated that the lateral or transverse alignment of the belt 12 along the axes of the rollers 14 and 16 should be closely maintained so that the grooves 36 are maintained in lateral registration with all of the corresponding fingers 31 or 33. This may be accomplished in a known manner by use of sprockets on the rollers 14 and 16 mating with corresponding sprocket holes along at least one edge of the belt 12. Alternative known edge or alignment guides of the belt may be utilized.

A variety of materials and methods of fabrication may be utilized for the belt 12. Preferably it is fabricated from an elastomeric low surface energy flexible plastic or rubber material, with sufficient conductivity to avoid static electricity build-up. An exemplary belt thickness may be approximately 0.25 to 1.5 millimeters. The belt with the grooves 36 integrally formed therein may be continuously fabricated and then the appropriate belt length cut off and seamed to form an endless loop. Alternatively, the grooves can be machined, or the entire belt with grooves monolithically formed by casting. If desired, the belt can have two or more layers of different material, such as a "Mylar" inelastic plastic substrate with an overcoating of white (light reflective) higher friction elastomeric or other material providing the document transporting outer surface 37.

The present system is particularly suited for a cooperative combination with a method for applying vacuum retention of the document to the belt which also avoids show-through or show-around images of the vacuum holes in the belt 12 from being reproduced on the copy sheets, and also provides improved, lower power, vacuum retention of the copy sheets. As shown in FIG. 2, multiple vacuum apertures 40 are provided through the belt 12 opening only in the base area 36b of the grooves 36. That is, the vacuum apertures in the belt are open at the image side of the belt recessed within the grooves 36.

Placing the vacuum inlet holes in the valleys or bottoms of grooves serves several purposes. The vacuum holes are moved out of contact with the document being transported. This serves to prevent show-through as long as the document has reasonable light diffusion characteristics. Further, since the document does not directly overlie and block the vacuum apertures, the grooves 36 distribute the vacuum along the grooves under the document.

Preferably the vacuum holes are located in discrete spaced groups around the belt circumference to which the documents are registered, so that the vacuum holes will be covered by the documents during imaging, to avoid show-around imaging of the holes. For example, by selection of the length of the belt and the size and spacing of the groups or patterns or holes along the belt, three (or another integral number) of pitches may be provided for that number of documents to be fed per belt revolution. For example, assuming a 30 centimeter platen in the direction of belt motion, three 37 centimeter pitches can be provided with a belt 111 centimeters in circumference. That is, three hole groups could be provided equidistantly around the belt. The length of each hole group in the direction of belt motion could be on the order of 5 centimeters. That is, only the area under the lead edge of the document need be apertured. Sixteen holes approximately 1.6 millimeter in diameter and approximately 3 millimeters apart, center-to-center, would be appropriate.

By selecting the pitch and the size of the hole patterns so that an unapertured length of belt is available which is longer than the platen size, this unapertured length of belt may be automatically positioned over the platen during manual copying to provide a continuous unapertured background for any size of copy being manually copied. This area may also be ungrooved (completely planar).

The "overhang" of the belt, i.e., its extension beyond the upstream and downstream edges of the platen, may be utilized for the document input area 26 and output area 28. This additional document transporting by the same system before and after copying may be desirably utilized to integrate this system with input sheet feeders and output stackers or other transports. For example, with the above-described exemplary three pitch belt and 30 centimeter platen and 3.8 centimeter diameter pulleys, there is provided an approximately 9-10 centimeter overhang or extension of the belt at each side of the platen.

As a preferred example, for a platen capable of full frame imaging of large standard documents a 103.5 cm long endless belt between two 25.4 cm diameter pulleys may have two spaced imaging areas, i.e., two patterned belt surface areas, with, for example, each pattern having approximately 52 parallel vacuum grooves extending linearly along the belt surface spaced approximately 7 mm apart, center-line to center-line, but with, for example, only 10 vacuum holes in each groove in only those selected areas of the total groove lengths which will be covered by the smallest document to be transported. The vacuum apertures through the belt may be approximately 2.8 mm in diameter round holes perpendicular the belt surface. The holes may be evenly spaced, within their limited areas, along the bottom and center line of the grooves approximately 9.4 mm apart. The grooves themselves may be approximately 4.6 mm wide at the belt imaging surface, and approximately 0.2 mm deep. The total belt thickness may be only approximately 0.45 mm. The shape of the grooves may be smoothly cylindrical to a much larger radius, e.g., approximately 13.3 mm, to avoid any angular transitions which could cause edge shadows. This also ensures, to the same end, a desired small slope angle (much less than 20 degrees) between the side walls of the grooves and the imaging surface. This low angle of incidence is an important feature. The transition lines between the edges of the grooves and the imaging surface area also preferably rounded or smoothed to blend in or transition smoothly.

With such shallow vacuum grooves, two (or more) of the grooves may be made somewhat wider and deeper than the other specifically for accommodating the registration fingers, and these two may also be unapertured.

A relatively low power and low pressure vacuum system 22 may be utilized. For example, a manifold vacuum level of not substantially greater than 25 millimeters of water and an air flow of somewhat more than only $1.8 \times 10^{-3}$ cubic meters per second could be sufficient.

With the above-described system of discrete vacuum hole groups, to which the document is to be fully overlaid, it will be appreciated that the document is registered to specific belt positions at the document input area 26. This may be accomplished by holding the document at the pre-registration gate 30 (or other preregistration gate) until a belt cursor 50, which may be holes or other indicia along the belt edge, actuates a photo-optical or other sensor 52 connected to the timing control 34. The document is thereby released at the appropriate time for the lead edge of the document to overlie the hole pattern and the document is then fed by the belt without slippage over the platen into registration. No over-platen registration is required. The same or other fiduciary marks 50 and sensors 52 may be used to stop the belt at the registration position (with the document properly positioned over the platen). The grooves need not be endless circumferentially. They may be restricted to the above-described discrete areas. In that case, the registration gates are synchronized to only engage the belt when a grooved area is overlying them.

As an alternative, the circumferential registration grooves 36 can be unapertured, with no applied vacuum. Between the grooves 36 other, separate, transverse grooves having the vacuum apertures 40 can be provided in combination. These transverse grooves would terminate before the longitudinal grooves 36 to provide pneumatic separation therefrom.

While the exemplary system described herein is presently considered to be preferred, various other modifications or improvements will be apparent to those skilled in the art. The following claims are intended to cover all such variations and modifications as fall within the true spirit and scope of the invention.

What is claimed is:

1. In an original document handling apparatus for moving successive individual document sheets on the surface of a movable belt into a registered position for copying at a copier imaging station, including registration means cooperatively engaging said belt and movable into and out of the path of said documents for their registration, the improvement wherein:
    said movable belt has a plurality of narrow elongated permanent grooves therein,
    said grooves extend in the direction of movement of said belt below said surface thereof,
    said grooves are transversely spaced on said belt,
    said grooves have gently sloped walls to avoid reproducible shadows thereof at said copier imaging station, and
    said registration means comprises at least two registration fingers transversely spaced corresponding to at least two of said grooves and narrower than said grooves and adapted to interfit into said grooves for the registration of said documents against said registration fingers without slippage between said documents and said fingers.

2. The document handling apparatus of claim 1, wherein said grooves include vacuum apertures therein for applying a vacuum along said grooves between said belt and said documents.

3. The document handling apparatus of claim 2, further including vacuum means for intermittently reducing a vacuum normally applied through said vacuum apertures in coordination with the movement of said registration means into and out of the path of said documents to facilitate relative slippage between said belt and said documents during said registration of said documents against said registration fingers.

4. The document handling apparatus of claim 1, 2, or 3, wherein said grooves have a depth of at least approximately 0.12 millimeters but not more than approximately one millimeter below the surface of said belt, and a width of less than approximately 5 millimeters.

5. The document handling apparatus of claim 1, 2, or 3, wherein said belt and said grooves therein are endless.

6. The document handling apparatus of claim 4, wherein said belt and said grooves therein are endless, but said grooves do not extend across the full width of said belt.

7. The document handling apparatus of claim 2, wherein said belt is endless, and wherein said vacuum apertures are in spaced groups smaller than said documents and identified in position along said belt by cursor means for alignment of individual documents over individual aperture groups to avoid show-around of said apertures.

8. The document handling apparatus of claim 1 or 2 or 3, wherein at least two of said grooves are deeper than the others to particularly accommodate said registration fingers.

* * * * *